(12) United States Patent
Patrigeon

(10) Patent No.: US 10,040,257 B2
(45) Date of Patent: Aug. 7, 2018

(54) MOLDING DEVICE FOR RECEIVING FIBERS AND A RESIN BY INJECTION

(75) Inventor: Olivier Patrigeon, Nanterre (FR)

(73) Assignee: SOCIETE LORRAINE DE CONSTRUCTION AERONAUTIQUE, Florange (FR)

( * ) Notice: Subject to any disclaimer, the term of this patent is extended or adjusted under 35 U.S.C. 154(b) by 843 days.

(21) Appl. No.: 13/394,215

(22) PCT Filed: Aug. 31, 2010

(86) PCT No.: PCT/FR2010/051811
§ 371 (c)(1),
(2), (4) Date: May 22, 2012

(87) PCT Pub. No.: WO2011/027074
PCT Pub. Date: Mar. 10, 2011

(65) Prior Publication Data
US 2012/0223456 A1    Sep. 6, 2012

(30) Foreign Application Priority Data

Sep. 4, 2009    (FR) ...................................... 09 04207

(51) Int. Cl.
*B29C 70/48*    (2006.01)
*B29C 33/40*    (2006.01)

(52) U.S. Cl.
CPC ............ *B29C 70/48* (2013.01); *B29C 33/405* (2013.01)

(58) Field of Classification Search
CPC ............................. B29C 70/48; B29C 33/405
USPC ....................................................... 425/265
See application file for complete search history.

(56) References Cited

U.S. PATENT DOCUMENTS

| 3,137,750 A | 6/1964 | Gringas |
| 2002/0145218 A1 | 10/2002 | Caldwell, Jr. |
| 2005/0235887 A1* | 10/2005 | Blakeley et al. ............. 108/161 |

FOREIGN PATENT DOCUMENTS

| DE | 3644434 A1 | 7/1988 |
| GB | 2242389 A | 10/1991 |
| WO | 2006/096647 A2 | 9/2006 |

OTHER PUBLICATIONS

International Search Report dated Nov. 22, 2010 by European Patent Office re: PCT/FR2010/051811; citing: GB 2 242 389 A, US 2002/145218 A1, WO 2006/096647 A2, DE 36 44 434 A1 and U.S. Pat. No. 3,137,750 A.

* cited by examiner

*Primary Examiner* — Joseph S Del Sole
*Assistant Examiner* — John P Robitaille
(74) *Attorney, Agent, or Firm* — Burris Law, PLLC

(57) ABSTRACT

The invention relates to a molding device (1) for receiving fibers onto which a resin is injected, including a base (3), side plates (5) confining the base (3), and a cover (7) capable of engaging with a free end (9) of the side plates (5) in order to define an inner space (11) for receiving the fibers and the resin, wherein said device (1) comprises, in the inner space (11), a skin (21) that is configured to be complementary to the inner surface of the cover (7) and to at least a portion of the inner surface of the side plates (5). The invention also relates to a method for manufacturing a resin part using such a device (1).

6 Claims, 1 Drawing Sheet

MOLDING DEVICE FOR RECEIVING FIBERS AND A RESIN BY INJECTION

TECHNICAL FIELD

The present invention relates to a molding device for receiving fibers on which a resin is injected comprising a base, side plates confining the base, and a cover capable of engaging with a free end of the side plates in order to define an inner space for receiving the fibers and the resin.

BRIEF DISCUSSION OF RELATED ART

Molding device typically comprise a base, also called a "tube," confined by side plates forming one or more side walls. In this way, a container is formed that is capable of containing material.

A cover is applied at one free end of said plates so as to close the molding device and also to form an inner space intended to receive the resin and fibers.

The side plates or the lid contain means making it possible to inject resin into the molding device according to the RTM (resin transfer molding) method.

Once assembled, this type of molding device makes it possible to impart the desired shape to the resin-impregnated fibers when the latter cools.

However, the elements making up this type of molding device are metal, for example made from aluminum or steel. When said device is closed by the cover, the fibers may bend, causing some of them to be pinched and thereby causing flaws that are harmful when manufacturing materials intended for aeronautics.

BRIEF SUMMARY

One aim of the present invention is therefore to provide a molding device avoiding damaging the fibers during molding of the resin.

To that end, according to a first aspect, the invention relates to a molding device for receiving fibers on which a resin is injected comprising a base, side plates confining the base, and a cover capable of engaging with a free end of the side plates in order to define an inner space for receiving the fibers and the resin, characterized in that said device comprises, in the inner space, a skin that is configured to be complementary to the inner surface of the cover and to at least a portion of the inner surface of the side plates.

The skin positioned in the inner space of the device according to the invention is capable of covering the inner surface of the cover and the inner surface of at least part of the side plates preventing the fibers from being in contact with the upper corners of the device according to the invention formed during closing of the device. As a result, the folding and pinching of the fibers is greatly limited. The part thus produced then has fewer flaws and better mechanical strength.

According to other features of the invention, the device according to the invention comprises one or more of the following optional features, considered alone or according to all possible combinations:

the skin covers substantially all of the inner surface of the side plates;
the skin is made from a material resistant to temperatures above 200° C., in particular silicone;
the sealing of the side plates and the cover is done by O-rings;
the skin has a substantially constant thickness.

According to another aspect, the invention relates to a method for manufacturing a resin part using the device according to the invention, comprising the following steps:

A—assembling the base and the side plates;
B—arranging the fibers inside the space formed by the base and the side plates;
C—placing the cover, the inner surface of which is covered by the skin, on the free end of the side plates thereby forming the molding device;
D—injecting the resin into the inner space comprising the fibers of the molding device.

Preferably, during step B, the fibers used form a dry fabric, a sewn fabric, or a woven preform.

BRIEF DESCRIPTION OF THE DRAWINGS

The invention will be better understood upon reading the following non-limiting description, done in reference to the appended figures.

DETAILED DESCRIPTION

Figure 1:
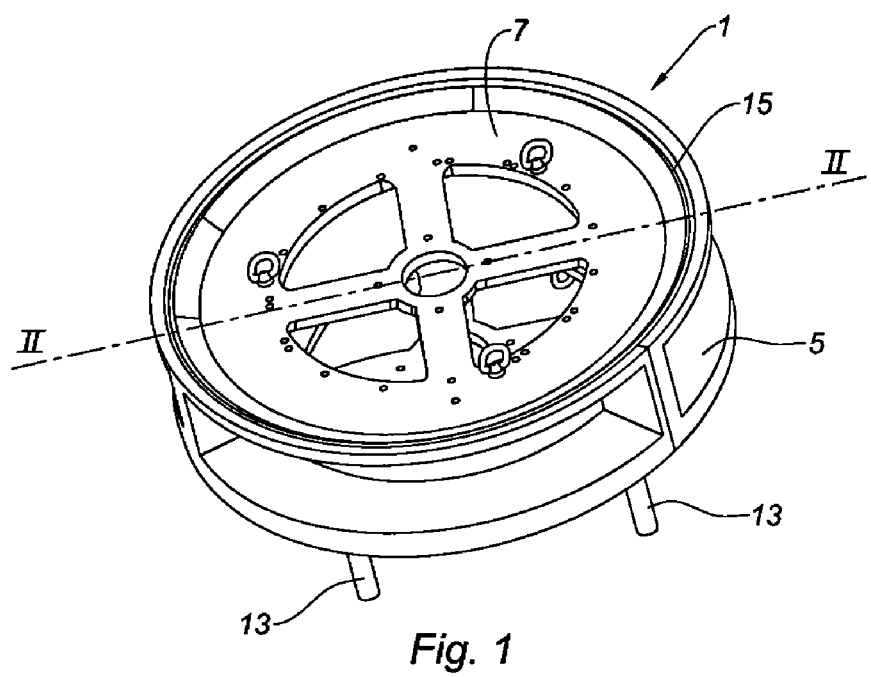
FIG. 1 is a perspective view of one embodiment of a device according to the invention.
Figure 2:
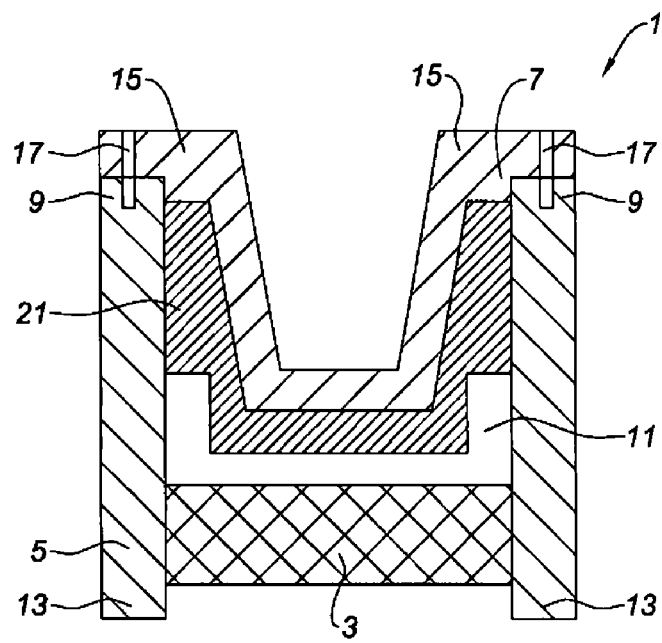
FIG. 2 is a transverse cross-section II-II of the embodiment shown in FIG. 1.

As illustrated in FIGS. 1 and 2, the device according to the invention 1 is capable of molding injected resin to form resin parts intended for the aeronautics industry. In this way, it is possible to manufacture all revolving parts, such as a shroud, for example.

One example of the resin used is epoxy resin.

The device 1 according to the invention comprises a base 3, also called a "tube," side plates 5 confining the base 3, and a cover 7 capable of engaging with a free end 9 of the side plates 5 in order to define an inner space 11 for receiving the resin and the fibers.

The base 3 can be of any shape suitable to impart the desired shape to one of the surfaces of the formed part. Thus, the base 3 can in particular be substantially cylindrical with a substantially circular section. The dimensions of the base are defined to be able to bear the injection pressure chosen for the part.

The side plates 5 are made up of one or more walls configured to be complementary to the peripheral surface of the base 3. It is possible, as illustrated in FIG. 2, for part of the side plates 5 to serve as feet 13 for the device 1 according to the invention. To that end, the base 3 is confined at a sufficient non-zero distance from one end of the side plates 5. According to one alternative, feet may be attached on the side plates 5 and the base 3.

The dimensions of the side plates 5 are defined to be able to bear the injection pressure chosen for the part, which may for example be greater than 1.5 bar.

The cover 7 can assume any suitable shape to impart the desired shape to the part. Thus, as shown in the figures, the cover 7 may have a substantially U- or V-shaped transverse section. In order to close the device 1 according to the invention, the cover 7 may comprise two ends 15 projecting above the free end 9 of the side plates 5 or cooperate therewith. The device 1 according to the invention can comprise closing means 17 ensuring the closing of the device 1. Said means 17 can for example be bolts.

The dimensions of the cover 7 are defined to be able to bear the injection pressure chosen for the part, which can for example be greater than 1.5 bar.

Typically, the base 3, the side plates 5 and the cover 7 are made from a metal material such as aluminum or steel, for example.

During the assembly of the device 1 according to the invention, the sealing of the side plates 5 and the cover 7 can be done by sealing means, such as O-rings.

The device 1 according to the invention comprises, in the inner space 11, a skin 21 that is configured to be complementary to the inner surface of the cover 7 and to at least a portion of the inner surface of the side plates 5. In one alternative, the skin 21 covers substantially all of the surface of the side plates 5. To that end, the skin substantially follows the surface formed by the cover 7 and the part of the side plates 5. In this way, the fibers positioned in the inner space 11 can no longer be in contact with the corners formed by the cover 7 and the end of the side plates 5. Thus, advantageously, the folding and pinching of the fibers is avoided.

The skin 21 is made from a material withstanding the injection temperature of the resin, i.e. a temperature above 200° C.

For example, the skin 21 is made from silicone. Silicone has the advantage of being a material withstanding the temperatures indicated above and that is inert relative to most of the resins used.

Furthermore, silicone has the advantage of having a coefficient of expansion allowing it to expand at a temperature above 200° C. As a result, silicone is capable of softening owing to the heat prevailing in the device according to the invention during molding of the part, and therefore of ensuring a regular pressure of the part so as to compact the fibers without folding the material.

Advantageously, the device 1 according to the invention makes it possible to preserve the integrity of the resin-impregnated fibers and therefore to manufacture better quality resin parts.

The skin 21 has a substantially constant thickness making it possible to obtain a constant compacting. The thickness of the skin 21 is chosen as a function of the volume of the part to be made. In fact, the skin 21 represents a film that must not impact the volume of the final part produced and must not create bulk in the inner space 11. Thus, the skin 21 is thin enough not to impact the shape of the part thus made and thick enough to smooth any inner surface flaw of the elements forming the device according to the invention.

The device 1 according to the invention also comprises means for receiving the resin by injection, in particular openings capable of receiving hoses injecting said resin into the inner space 11.

Furthermore, the invention also comprises a method for manufacturing a resin part using the device 1 according to the invention, comprising the following steps:

A—assembling the base 3 and the side plates 5;

B—arranging the fibers inside the space formed by the base and the side plates;

C—placing the cover 7, the inner surface of which is covered by the skin 21, on the free end 9 of the side plates, thereby forming the molding device 1;

D—injecting the resin into the inner space 11 comprising the fibers of the molding device 1.

Preferably, during step B, the fibers used form a dry fabric, a sewn fabric, or a woven preform.

In step D, the resin is injected between 20° C. and 150° C. with a pressure comprised between 1.5 bar and 15 bars.

The invention claimed is:

1. A molding device for receiving fibers on which a resin is injected comprising:
   a base;
   side plates confining the base;
   a cover capable of engaging with free ends of the side plates in order to define an inner space for receiving the fibers and the resin;
   a skin in the inner space, said skin covering an entire inner surface of the cover and being complementary to the inner surface of the cover and to at least a portion of an inner surface of the side plates when said cover is engaged with the free ends of the side plates, the skin being a constant thickness and providing constant pressure to a part to be formed in the molding device so as to compact the fibers without folding/pinching the fibers;
   openings in communication with the inner space; and
   hoses disposed within the openings for injection of the resin.

2. The device according to claim 1, wherein the skin covers substantially all of the inner surface of the side plates.

3. The device according to claim 1, wherein the skin is made from a material resistant to temperatures above 200° C.

4. The device according to claim 3, wherein the skin is made from silicone.

5. The device according to claim 1, wherein a sealing of the side plates and the cover is done by O-rings.

6. The device according to claim 1, wherein the skin has a substantially constant thickness.

* * * * *